M. Ormsbee,
Photographic Printing Frame,
No. 38,326. Patented Apr. 28, 1863.
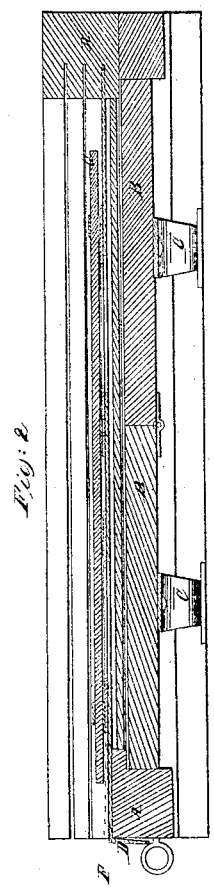
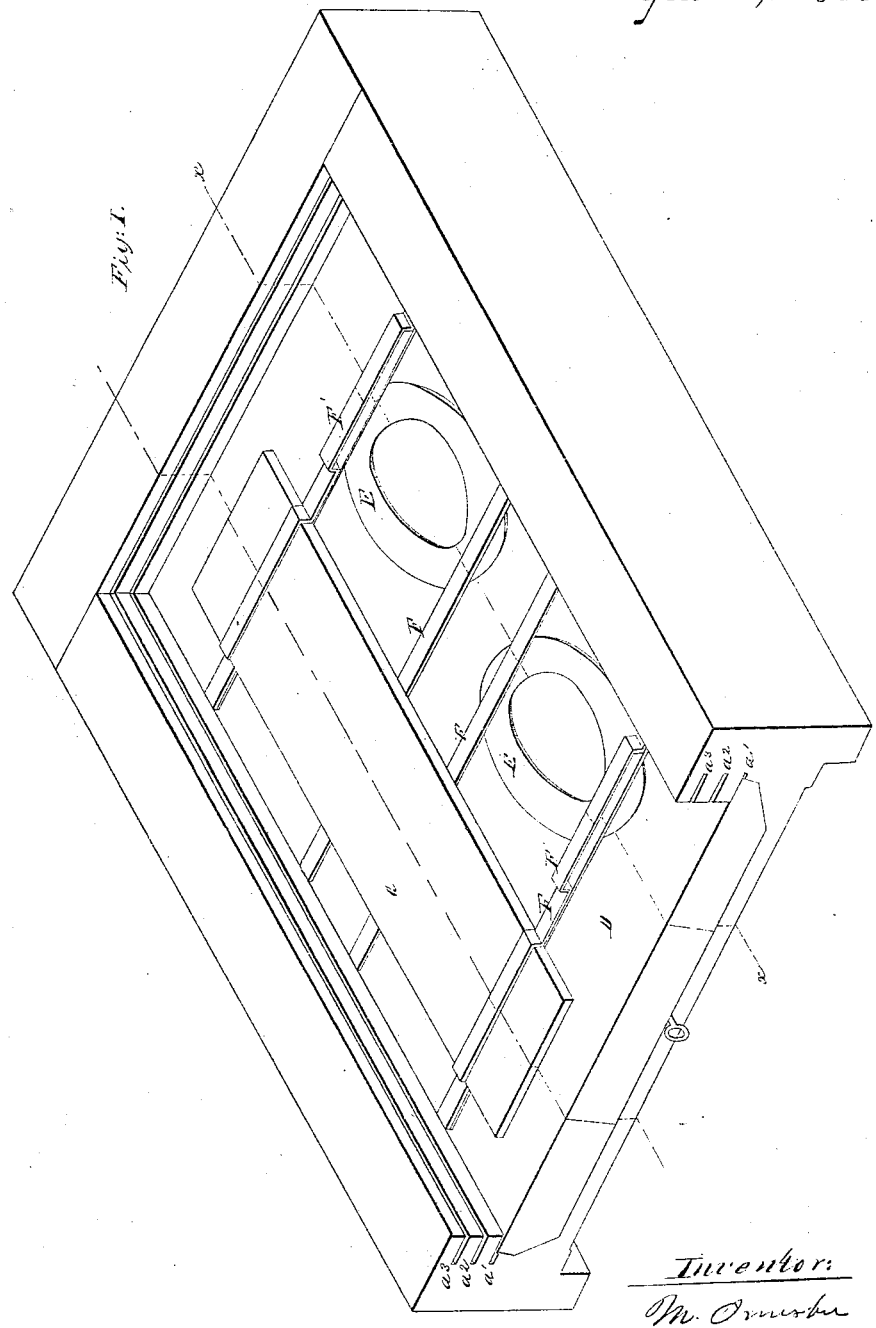
Witnesses:
Octavius Knight
Charles Smith
Inventor:
M. Ormsbee

UNITED STATES PATENT OFFICE.

MARCUS ORMSBEE, OF NEW YORK, N. Y.

PHOTOGRAPHIC-PRINTING FRAME AND SLIDE.

Specification forming part of Letters Patent No. 38,326, dated April 28, 1863.

*To all whom it may concern:*

Be it known that I, MARCUS ORMSBEE, of the city, county, and State of New York, have invented a new and Improved Photographic-Printing Frame and Slide; and I do hereby declare the following to be a full and exact description of the same, reference being had to the accompanying drawings, making a part of this specification, in which—

Figure 1 is a perspective view of my said invention with one of the glasses removed. Fig. 2 is a vertical longitudinal section of the same at $x\ x$, Fig. 1.

Similar letters of reference indicate corresponding parts in both views.

This invention relates to an improved construction of photographic-printing frame with a metallic or other slide perforated with elliptical or other apertures of sufficient size to permit the use of egg-shaped or other annular screens of card-board, which may be adjusted independently in any required manner to adapt them to correspond with the position and form of the picture to be printed, as hereinafter explained.

The invention further consists in the use of plates of doubly-ground glass to soften and distribute the light used in printing.

In order that others skilled in the art to which my invention appertains may be enabled to fully understand and use the same, I will proceed to describe its construction and operation.

A A represent various parts of a frame provided with a hinged back, B, and catches C, of common construction. D is a perforated slide, of metal or other material, adapted to fit in either of the grooves $a'\ a^2\ a^3$ of the frame A in order to secure it at a greater or less distance from the negative plate.

E E represent elliptical screens of pasteboard or other material, colored in any suitable way to prevent the transmission of light, with apertures of elliptical, egg-shaped, or other form of any desired size. The said screens fit beneath straps F F on the upper face of the slide D, so as to partially cover the apertures in the latter and be capable of ready adjustment in any direction—longitudinally, laterally, or on their axes.

G G represent plates of glass ground on both their surfaces. The said glasses slide in loops or boxes F' F', which may be formed over or upon the straps F.

H represents the negative-plate.

The operation is as follows: The negative-plate and sensitized paper are inserted in customary manner by removing the back B. The slide D is adjusted nearer to or farther from the negative-plate, according to the size and diameter of the picture, and the screens E E are inserted to correspond with the form and size of the vignette desired. The doubly-ground glasses G are then inserted over the apertures in the screens, and the apparatus is ready for printing, which is performed by exposure in the usual way.

The above-described apparatus possesses many great advantages over that in common use. Among these may be mentioned the following: First, it admits of printing one, four, eight, sixteen, thirty-six, or even any larger number of pictures accurately at a single operation. Second, the screens E being movable permits the use of any-sized aperture to suit the size of picture desired, and each of the said screens, being adjustable independently either longitudinally, laterally, or on its axis, may be set to correspond accurately with the position of the picture. Third, the perishable parts are so effectually protected that no injury will result from a slight exposure to the rain. Fourth, the apparatus is simple, economical, and durable, and at the same time is very complete and effective in its operation.

Having thus described my invention, what I claim as new therein, and desire to secure by Letters Patent, is—

1. A perforated slide, D, of metal or other material, adjustable in its proximity to the negative-plate, substantially as described.

2. In combination with a main perforated slide of any suitable construction, the separate independently-adjustable perforated screens E E, employed in the manner and for the purposes set forth.

3. The use of the doubly-ground glasses G G in the manner set forth to soften and equalize the light.

M. ORMSBEE.

Witnesses:
 OCTAVIUS KNIGHT,
 R. H. MAYHEW.